(12) United States Patent
Nishizawa

(10) Patent No.: US 7,387,509 B2
(45) Date of Patent: Jun. 17, 2008

(54) INJECTION MOLDING MACHINE

(75) Inventor: Toshimichi Nishizawa, Kanagawa (JP)

(73) Assignee: Sanjo Seiki Co., Ltd., Saitama (JP)

(*) Notice: Subject to any disclaimer, the term of this patent is extended or adjusted under 35 U.S.C. 154(b) by 180 days.

(21) Appl. No.: 11/136,381

(22) Filed: May 25, 2005

(65) Prior Publication Data
US 2005/0220930 A1 Oct. 6, 2005

Related U.S. Application Data

(63) Continuation of application No. PCT/JP2003/014990, filed on Nov. 25, 2003.

(30) Foreign Application Priority Data
Nov. 26, 2002 (JP) ............................. 2002-341899

(51) Int. Cl.
*B29C 45/62* (2006.01)
(52) U.S. Cl. ...................................................... 425/557
(58) Field of Classification Search ................ 425/557, 425/558, 559, 560, 561
See application file for complete search history.

(56) References Cited

U.S. PATENT DOCUMENTS 5,665,282 A 9/1997 Nakamura 6,468,464 B1 * 10/2002 Eckardt et al. .............. 425/557

FOREIGN PATENT DOCUMENTS

| JP | 30-16470 Y1 | 11/1955 |
| JP | 45-10829 B1 | 4/1970 |
| JP | 10-166403 A | 6/1998 |
| JP | 10-305457 A | 11/1998 |
| JP | 2003-011189 A | 1/2003 |

* cited by examiner

*Primary Examiner*—Tim Heitbrink
(74) *Attorney, Agent, or Firm*—Jones, Tullar & Cooper, PC

(57) ABSTRACT

An injection molding machine includes an injection pot with an injection nozzle and a side casting port for feeding a material into the pot. The tip part of a plunger disposed in the pot is formed in such as shape that the tip part of the injection pot can be generally filled with the material after an injection is completed. A fitting part pressingly cuts off the material from the feeder by allowing a boundary part between the plunger body and its tip to be formed at a corresponding part between the injection pot body and its tip part. When the tip of the plunger is inserted into the tip of the injection pot, a clearance S is formed between the tip parts and the feeding port is opened to the fitting part, whereby the injection molding machine is capable of performing the assured pressing cutting off and excellent injection of plastic rubber in the injection pot and effective removal of residual rubber with fewer injection cycles, and is capable of providing a higher production efficiency and excellent strength.

11 Claims, 8 Drawing Sheets

Injection pot tip angle and performance

<Injection pot of B type>

<Injection pot of C type>

Tip angle θ of injection pot and endurance pressure

INJECTION MOLDING MACHINE

This application is a Continuation under 35 U.S.C. Sections 120 and 365(c) of International Application No. PCT/JP2003/014990, which was filed on Nov. 25, 2003 and designates the US. The PCT application was published on Jun. 10, 2004 as WO2004/048069A1.

The present invention relates to an improvement in an injection molding machine, and particularly relates to an improvement in an injection molding machine of a pre-plasticizing ("pre-pla") type suitable for injection molding of rubber.

BACKGROUND

A pre-plasticizing type injection molding machine is illustrated in FIG. 14. This machine consists of an extruding machine 3 provided with a screw 2 and has a plasticizing and feeding function while measuring. An injection pot 6 inside of a metal barrel 1 is coupled to the extruding machine 3 via a passage 5 with a check valve 4. A plunger 7 reciprocates in the injection pot 6, a part 8 positioned at a tip of the pot 6 serving as an injection passage (hereinafter, "a tip part of the injection pot"). An injection nozzle 9 is provided at a tip of the tip part 8 of the injection pot inside the metal barrel 1, where a lower portion of the metal barrel 1 positioned near its lower end is supported by an upper die plate 11 on a mold 10. Here, reference numeral 12 denotes a lower die plate coupled by the upper die plate 11 and tie bars 13, reference numeral 14 denotes an insulating plate, and reference numeral 15 denotes a lower mold also serving as a heater plate.

In the injection molding machine, first, raw rubber is supplied into the extruding machine 3 as indicated by an arrow in FIG. 14, it is plasticized while being fed to the left in FIG. 14 by the screw 2, and the plasticized rubber is fed into the injection pot 6 by the passage 5 via the check valve 4, while measuring, and the plunger 7 is elevated by the feeding pressure of the plasticized rubber. Next, by pushing down the plunger 7, plasticized rubber inside the injection pot 6 is fed into the die 10 via the tip part 8 of the injection pot and the nozzle 9 and is injected into cavities 19, 20 in the mold 10 via a sprue 16, a runner 17, and a gate 18, where curing is conducted.

In order to improve production efficiency of a cured rubber product, and to reduce product cost, it is effective to reduce the curing time for the plasticized rubber in the cavities 19, 20. To do this, the temperature of the rubber in the injection pot 6 is required to be set as high as possible. However, when the temperature of plasticized rubber in the injection pot 6 is made excessively high, "an initial stage were a curing reaction starts so that flowability is lost", referred to as scorching, occurs easily, so that scorched rubber advances into the cavities 19, 20, which may result in product failure or clogging at the tip part 8 of the injection pot or the nozzle 9.

Control of plasticized rubber temperature is important for avoiding the above circumstances. In this context, an injection molding machine such as that illustrated in FIG. 14, is convenient. In this machine, plasticized rubber is fed into the injection pot 6 from a side part of the pot via the passage 5, after being plasticized and metered within the extruding machine 3, and the rubber temperature after heat generation due to the plasticization in the extruding machine 3 and the heat-retention temperature inside the injection pot 6 can be controlled independently.

Incidentally, in an injection molding machine where a screw extruding machine is incorporated, in a plunger-type injection molding machine such as that disclosed in Japanese Patent No. 3174346, to be described later, the rubber temperature after heat generation inside the screw extruding machine and the temperature inside the injection pot influence each other, resulting in difficulty in controlling both temperatures separately from each other. In a commercially-available injection molding machine of one kind, where a plasticized material from an extruding machine is fed into the pot from a nozzle at a tip part of the injection pot, an attempt has been made to utilize the injection heat generated by the small diameter of the nozzle for reducing the curing time. However, this design requires a great deal of time for feeding the plasticized material into the injection pot.

In the machine shown in FIG. 14, the generation of scorched rubber is further accelerated when rubber adheres to an inner wall face, such as that of the injection pot 6, and remains at that place for a long time. It is therefore desirable to reduce as much as possible the number of mold injections required for replacing the plasticizing rubber present in the injection pot 6 with fresh-fed plasticizing rubber. This shortens the time the rubber remains adhered to the inner wall face in order to suppress generation of scorched rubber.

That is, it is desirable that rubber in the injection pot or the tip part be injected completely into the molds and be replaced by fresh plasticizing rubber in the fewest possible number of injections, but when the number of injections required to inject all of the rubber in the injection pot increases, the replacing performance is poor. Further, when the temperature in the injection pot 6 is elevated, scorching occurs easily. On the other hand, when the replacing performance is excellent, and the number of mold injections needed to inject all the rubber in pot 6 can be reduced, then the time during in which plasticizing rubber is overheated on the inner wall face of the pot is shortened. As a result, the generation of scorch can be suppressed.

In the general injection molding machine shown in FIG. 14, since the tip part 8 of the injection pot has the same diameter over its entire length, and the flowing velocity of plasticizing rubber is considerably reduced at its inner wall face as compared with the central part of the rubber at the time of injection, plasticizing rubber tends to remain on the walls, like cholesterol, when an injection is completed. In order to remove the residual rubber from the tip part 8 of the injection post as preparation for replacement by fresh plasticizing rubber, the injection must be repeated many times (at least six times).

When residual rubber accumulates at the tip part 8 of the injection pot over a period of time, so that the inner diameter (flow diameter) of the passage 8 becomes small, removal cannot be achieved just by repetition of the injection. In such a situation, the residual rubber may be generally removed, for example, by detaching the barrel 1 from the upper die plate 11 to clean the tip part 8 of the injection pot, the injection nozzle 9, and the like. This is usually done after a number of injections, obtained experimentally, and requires much time and labor and causes an increase in cost.

In order to solve this problem, it has been suggested that by gradually reducing the diameter of the tip part of the injection pot toward the nozzle, and setting the inclination angle of the inner wall face of tip part of the injection pot relative to the axial line of the injection pot to 0.2° or more (in a section including the axis), like the injection molding machine describe in Japanese Patent Application Laid-open No. H10-166403, a flow rate distribution of plasticizing rubber at the time of injection is changed to improve the flow rate at the inner wall part of the tip part of the injection pot to prevent the residue of plasticizing rubber at the time of injection completion. However, when clogging does occur in the shape shown in the above application, the problem of the clogging cannot be solved by a repetition of the injection, and the clogged rubber has to be taken out by disassembling the injection molding machine, or part replacement has to be conducted, so that the time and cost therefor are further increased as compared with the above-described case.

Briefly, in a conventional, common injection molding machine, since plasticizing rubber tends to easily remain on the inner wall face in the tip part of the injection pot or like structure, the number of times an injection must be repeated in order to replace the residual rubber is increased beyond necessity. Besides, when the residual rubber cannot be removed even by injections for replacements, it is necessary to detach the barrel to perform cleaning, and the time and cost therefor are significant. Further, in injection molding machines where the tip part of the injection pot is gradually reduced toward the nozzle, which is described in the above application, once clogging occurs in the passage, disassembling of the injection molding machine, part replacement therein or the like is also required. The occurrence of such problems means that the rubber within the injection pot must be set to a temperature within the range in which scorching does not occur, with the result that an improvement in production efficiency and reduction in product cost cannot be achieved.

In view of these circumstances, the present inventor previously made an invention, disclosed in Japanese Patent Application Laid-open No. 2001-237148, that has, as a main object, the removal of residual rubber effectively without cleaning or disassembling the machine while reducing the number of times of injection for replacing the residual rubber to as few as possible. That application is directed to an injection molding machine where an injection pot is provided with a feeding port for supplying a formed material in a plasticized state into the pot. A plunger is slidably disposed in the injection pot, and a tip part of the plunger is formed in such a shape as to fill a tip part of the injection pot at the time of injection.

For example, as illustrated in FIGS. 12 and 13, a tip part 22 of an injection pot 24 in a barrel 21 is formed in a shape having a tapered section leading directly from a lower end of the injection pot 24 body part. An inner face of an injection nozzle 23 is also formed with an inner wall 23a having a tapered section which is continuous with the tip part 22 of the injection pot. A tip part 27 of a plunger 26 is formed to conform with the shapes of the tip part 22 of the injection pot and the inner wall 23a of the injection nozzle 23. The angle θ of the tapered selection depends on the diameter of the injection pot 24 and is determined according to the size of the injection molding machine, the thickness of the upper die plate 11, and the position of the extruding machine 3 mounted on the barrel 21. The taper angle θ is set to 30° in the illustrated example.

According to the above construction, plasticized rubber is fed by the extruding machine 3 into the injection pot 24 through a feeding port 25, via a passage 5. The rubber in pot 24 is pressed into the tip part 22 of the injection pot by the descent of plunger 26, and is forced into cavities 19, 20 in the mold 10 via the nozzle 23 and is cured. After a predetermined descending of the plunger 26, the tip part 27 thereof advances into the tip part 22 of the injection pot so that the plunger 26 descends while continuously injecting rubber from the injection nozzle 23. At this time, the flow rate on the inner wall face becomes large, owing to the shape of the tip part 22 of the injection pot, so that rubber on the wall face flows down without delay. Since the tip portion 22 of the injection pot is formed in a tapered shape, the junction, or a connecting point K between the tip part 22 of the injection pot and the injection pot 24 approaches a straight line, and the angle between the tip part and the pot constitutes an obtuse angle. Therefore, flowing-down of the rubber is conducted smoothly, so that the possibility of scorching is reduced.

When the lower end of the body part of the plunger 26 reaches a lower end of the injection pot 24, as shown in FIG. 13, the entire plunger tip part 27 fits into the tip part 22 of the injection pot and the projection end 27a of the plunger abuts on the inner wall 23a of the injection nozzle 23. At this time, there is hardly any residue of rubber in the tip part 22 of the injection pot or in the injection nozzle 23 in this example, so that it is unnecessary to repeat the injection cycle many times in order to remove residual rubber from the tip part 22 of the injection pot or the like as preparation for replacement by fresh plasticized rubber.

SUMMARY OF THE INVENTION

According to research performed by the present inventor, it has been found that it is important to form a fitting part in an injection pot for the pressingly cutting off formed material in a plasticized state that is to be injected. This is done by providing a boundary between a plunger body part and the plunger tip part to be fitted to a boundary (the K point in FIG. 12 or the location of a pot diameter-reduced part) between the injection pot body part and the injection pot tip part in order to prevent rubber from remaining in the tip part 22 of the injection pot or in the injection nozzle 23. If such a boundary fitting can be formed, the residue of rubber can be prevented sufficiently, even if the tip part 27 of the plunger 26 is not completely fitted into the tip part 22 of the injection pot so that the projection end 27a does not abut the inner wall 23a of the injection nozzle 23. Thus, a boundary fitting which will provide a clearance, as will be described later, between the tip part 27 of the plunger and the inner wall 23a of the injection nozzle 23, will sufficiently prevent a residue of rubber.

The present inventor has also found that ascending of the plunger 26 can be facilitated by providing a clearance at the boundary, and ascending of the plunger 26 can be made possible by only supplying a plasticized material from a feeding port to make a formed material in the barrel 1.

Furthermore, the present inventor has found the following matters: (1) "replacing performance" in a passage "c" between an injection pot "a" and a nozzle "b", as illustrated in FIG. 5, is largely related to an angle θ of the passage, according to experiment (see FIG. 6), where, for example, when the angle θ is 3°, the number of times of injection for replacement has to be 10 times, but when the angle θ is 10°, the number is 3 times, and when the angle θ is 60°, the number is 1 time. Accordingly, an angle θ that is 10° or larger is sufficient to practically prevent remnant, or cholesterol-like, scorching from occurring; and (2) the strength of a tip part wall a' of the injection pot "a" decreases according to the increase in the tip part angle θ of the injection pot "a" in structures such as those shown in FIGS. 7, 8 and 9, but it is understood from FIG. 9 that there is a branching point of deformation near a tip part angle of 40° and it is preferable in view of the tip wall strength that the tip part angle θ be equal to or less than 40°. Accordingly, it is found from the above matters (1) and (2) that a tip part angle θ in a range of 10° to 40° is preferable for an injection pot in accordance with the present invention.

Accordingly, an object of the present invention is to provide an injection molding machine capable of performing thermal control securely, assuring a pressure cutting-off of plasticized rubber inside an injection pot while performing excellent injection, and performing effective removal of residual rubber in the injection pot with a lower number of times of injection.

Another object of the present invention is to provide an injection molding machine which can facilitate ascending of a plunger, thereby providing efficient production efficiency and excellent strength.

Accordingly, the present invention provides an injection molding machine wherein an injection pot is provided with an injection nozzle and with a feeding port for supplying a plasticized material from a side part into the pot. The pot is formed in the shape of a barrel, a plunger is slidably disposed in the injection pot, and a tip part of the plunger is formed in such as shape that a tip part of the injection pot can remain generally filled with the material when an injection of a formed material is completed. A first boundary is formed between a body part of the plunger and a tip part of the plunger, and a second boundary is formed between a body part of the injection pot and the tip part of the injection pot. When the tip part of the plunger is inserted into the tip part of the injection pot so as to generally fill the tip part of the injection pot, the boundary parts engage each other to form a pressure fitting, and pressingly cut off the formed material which is in a plasticized state. A clearance is formed between the tip part of the plunger and the tip part of the injection pot below the fitting part, and the feeding port is opened to the fitting part in the plunger. Thereby, the injection molding machine is capable of performing thermal control securely by supplying a formed material in a plasticized state through a side part of the injection pot. The machine is capable of performing an assured pressing cutting off and excellent injection of plasticized rubber in the injection pot by forming a boundary fitting which pressingly cuts off the formed material in a plasticized state the fitting being formed by a boundary part between a body part of the plunger and a tip part thereof, engaging a boundary part between an injection port body part and the tip part thereof. This construction provides effective removal of residual rubber in the injection pot with fewer injections, and is combined with a construction where the tip part of the plunger is formed in such as shape that the tip part of the injection pot can be generally filled with the material when an injection of a formed material is completed, thus providing efficient production and excellent strength.

BRIEF DESCRIPTION OF THE DRAWINGS

The forgoing, and additional objects, features and advantages of the present invention will be further understood from the following detailed description of preferred embodiments thereof, in which.

DESCRIPTION OF PREFERRED EMBODIMENTS

The present invention will be further explained with reference to FIGS. 1 to 4 among the accompanying drawings.

Figure 1:
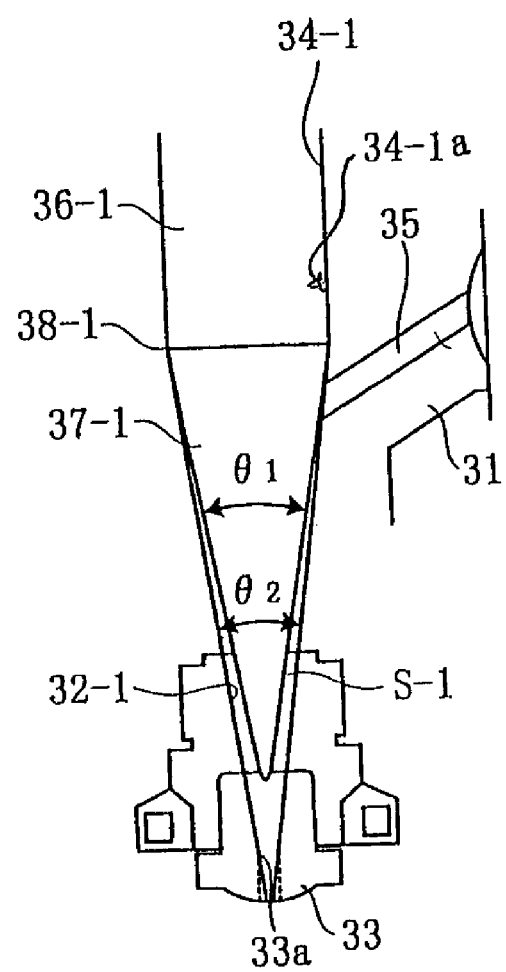
FIG. 1 is a diagrammatic sectional view of relevant parts of a first embodiment of an injection molding machine according to the present invention.

In an injection molding machine in accordance with the present invention, as illustrated in FIG. 1, an injection pot 34-1 is provided with an injection nozzle 33 and a feeding port 35 for supplying a formed material that has been put in a plasticized state through a side part into the injection pot 34-1. These components are formed in a barrel 31. A plunger 36-1 is slidably disposed in the injection pot 34-1, and a tip part 37-1 of the plunger 36-1 is formed in such a shape that it is spaced from a tip part 32-1 of the injection pot, allowing the tip part 32-1 to be generally filled with the formed material when an injection of the formed material into the pot has been completed. A plunger fitting part 38-1 pressingly cuts off the formed material. The fitting part 38-1 of the plunger is formed by a plunger boundary between the body part 36-1 of the plunger and the tip part 37-1 thereof. This fitting part engages a corresponding injection pot boundary part between the body part 34-1a of the injection pot and the tip part 32-1 thereof when the tip part 37-1 of the plunger is inserted into the tip part 32-1 of the injection pot far enough to generally fill the tip part 32-1 of the injection pot. The engagement of the fitting part 38-1 with the injection pot boundary part causes a clearance S-1 to be formed between the tip part 37-1 of the plunger and the tip part 32-1 of the injection pot below the fitting part 38-1. This clearance allows feeding port 35 to be open to the fitting part 38-1 of the plunger 36-1.

Explaining the embodiment of FIG. 1 in further detail, first, the tip part 32-1 of the injection pot is directly formed from a lower end of the injection pot body 34-1 so as to have a tapered section. An inner face of the injection nozzle 33 is also formed to have an inner wall 33a with a tapered section that is continuous with the wall of the tip part 32-1 of the injection pot. The tip part 37-1 of plunger 36-1 is formed in a tapered shape similar to that of the tip part 32-1 of the injection pot and of the inner wall 33a of the injection nozzle 33. The taper angle θ1 of the tip part 37-1 of the plunger 36-1 is larger than the taper angle θ2 of the tip part 32-1 of the injection pot, so that the clearance S-1 is formed below the fitting part 38-1, as shown in FIG. 1.

The clearance S-1 is determined experimentally so that the remaining amount of the formed material does not scorch and constitute an obstacle after the formed material is injected out from the tip part 32-1 of the injection pot, and so that ascending of the plunger 36-1 can be performed easily. The angle θ2 of the taper is determined according to the diameter of the injection pot 34-1, which depends on the size of the injection molding machine, the thickness of the upper die plate 11, and the position of the extruding machine which is mounted on the barrel 31 to supply material to feeding part 35.

With the above construction, when the plunger 36-1 is ascended while a formed material is being fed into the feeding port 35, or before feeding, the ascending can be performed easily. Even when the formed material is injected out from the injection pot tip 32-1 by pushing down the ascended plunger 36-1, the boundary part between the body part 34-1a of the injection pot 34-1 and the tip part 32-1 abuts on the fitting part 38-1 of the plunger 36-1 to pressingly cut off the formed material extruded from port 35. Accordingly, formed material hardly remains as scorch in the space S-1.

Figure 2:
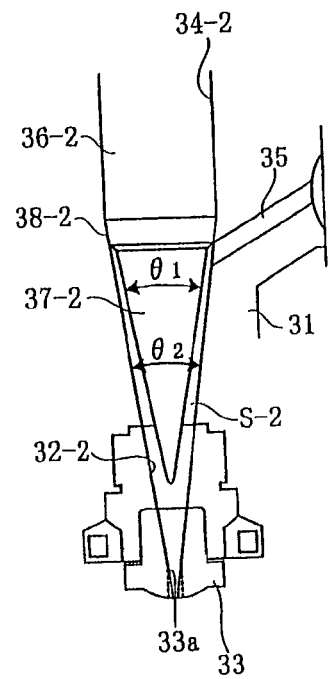
FIG. 2 is a diagrammatic sectional view of relevant parts of a second embodiment of an injection molding machine according to the present invention.

In an embodiment illustrated in FIG. 2, a tip part 32-2 of an injection pot 34-2 is formed to have a slightly narrower tapered section from the lower end of the body starting at an annular fitting part 38-2. An inner face of the injection nozzle 33 is also formed to have an inner wall 33a with a tapered section continuous to the tip part 32-2 of the injection pot. The tip part 37-2 of a plunger 36-2 is formed in a tapered shape that is similar to those of the tip part 32-2 of the injection pot and the inner wall 33a of the nozzle 33. The taper angle θ1 of the tip part 37-2 of the plunger 36-2 is larger than the angle θ2 of the tip part 32-2 of the injection pot, resulting in a clearance S-2 formed below the fitting part 38-2, as shown in FIG. 2.

The clearance S-2 may be determined experimentally so that a remaining amount of a formed material does not constitute an obstacle as scorch after the formed material is injected out from the tip part 32-2 of the injection pot, and so that ascending of the plunger 36-2 can be performed easily. The angle θ of the taper is determined according to the diameter of the injection pot 34-2, and depends on the size of the injection molding machine, the thickness of the upper die plate 11, and the position of an extruding machine mounted on the barrel 31.

With the above construction, when the plunger 36-2 is ascended while a formed material is being fed into the feeding port 35, or before feeding, the ascending can be performed easily. Besides, even when the formed material is injected out from the tip part 32-2 of the injection pot by pushing down the ascended plunger 36-2, the boundary part between the body part 34-2a of the injection pot 34-2 and the tip part 32-2 abuts on the fitting part 38-2 of the plunger 36-2 to pressingly cut off the formed material being extruded. Accordingly, the formed material hardly remains as scorch in the injection pot tip 32-2.

Figure 3:
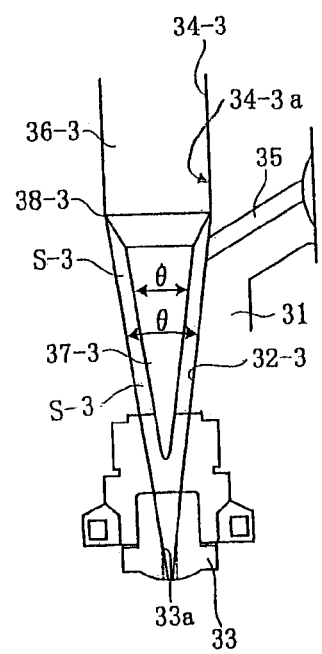
FIG. 3 is a diagrammatic sectional view of relevant parts of a third embodiment of an injection molding machine according to the present invention.

In an embodiment illustrated in FIG. 3, the tip part 32-3 of an injection pot 34-3 is formed to have a slightly narrower tapered section extending downwardly from the lower end of the body part 34-3a of the injection pot 34-3 via a slightly larger annular fitting part 38-3. An inner face of the nozzle 33 is also formed to have an inner wall 33a with a tapered section that is continuous with the injection pot tip part 32-3, and the shape of the tip part 37-3 of the plunger 36-3 is formed in a tapered shape that is similar to those of the tip part 32-3 of the injection pot and the inner wall 33a of the injection nozzle 33. The taper angle of the tip part 37-3 of the plunger 36-3 and the angle of the tip part 32-3 of the injection pot are set to the same angle θ, and a clearance S-3 is formed below the fitting part 38-3, as shown in FIG. 3.

The clearance S-3 may be determined experimentally, such that a remaining amount of a formed material does not constitute an obstacle as scorch after the formed material is injected out from the tip part 32-3 of the injection pot and ascending of the plunger 36-3 can be performed easily. The angle θ of the taper is determined according to the diameter of the injection pot 34-3, and depends on the size of the injection molding machine, the thickness of the upper die plate 11, and the position of an extruding machine mounted on the barrel 31.

With the above construction, when the plunger 36-3 is ascended while a formed material is being fed into the feeding port 35 or before feeding, the ascending can be performed easily. Besides, when the formed material is injected out from the tip part 32-3 of the injection pot by pushing down the ascended plunger 36-3, the boundary part between the body part 34-3a of the injection pot 34-3 and the tip part 32-3 abuts on the fitting part 38-3 of the plunger 36-3 to pressingly cut off the formed material extruded from port 35. Accordingly, formed material hardly remains as scorch in the space S-3.

Figure 4:
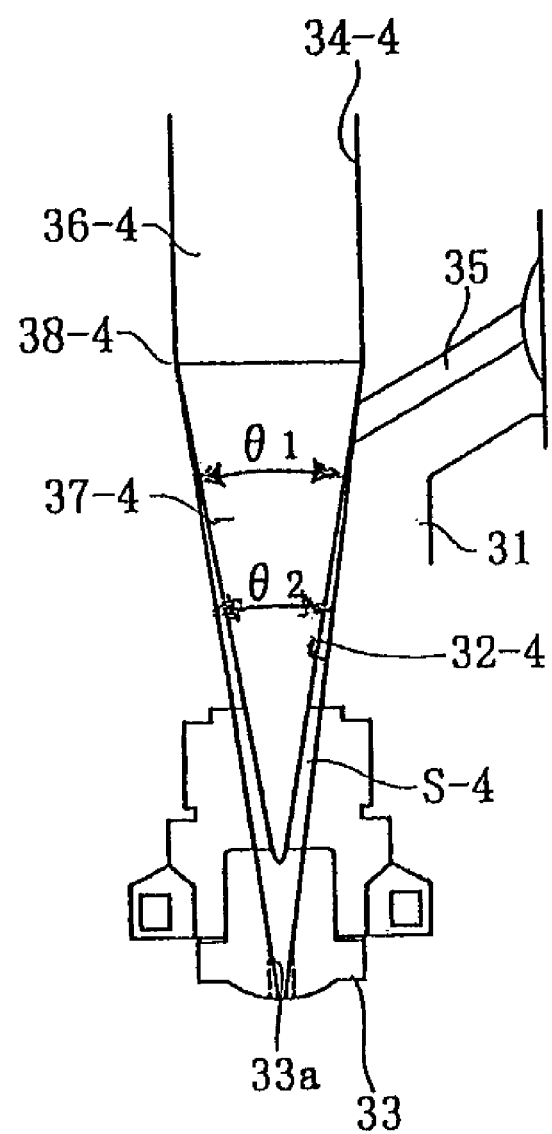
FIG. 4 is a diagrammatic sectional view of relevant parts of a fourth embodiment of an injection molding machine according to the present invention.
Figure 5:
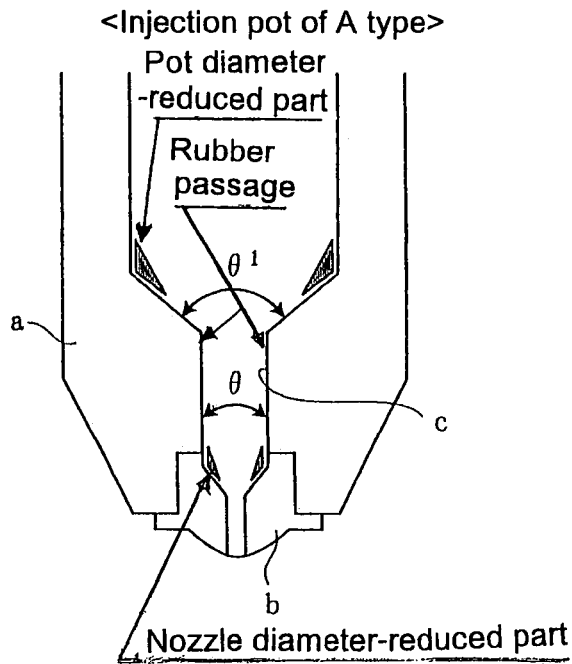
FIG. 5 is a diagrammatic sectional view showing one example of relevant parts of an injection molding machine, for explaining the tip part angle of an injection pot and its performance.
Figure 6:
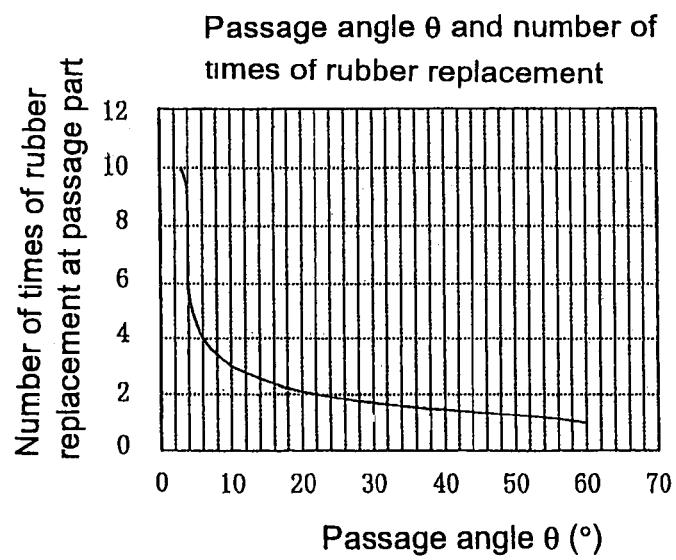
FIG. 6 is a correlation diagram between a tip part passage angle of an injection port and the number of times of rubber replacement.
Figure 7:
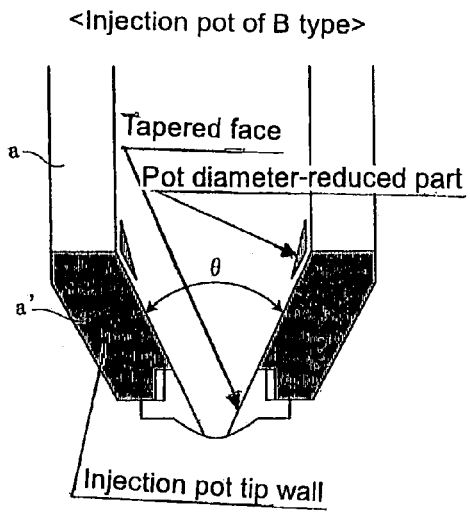
FIG. 7 is a diagrammatic sectional view showing another example of relevant parts of an injection molding machine, for explaining the tip part angle of an injection pot and its performance.
Figure 8:
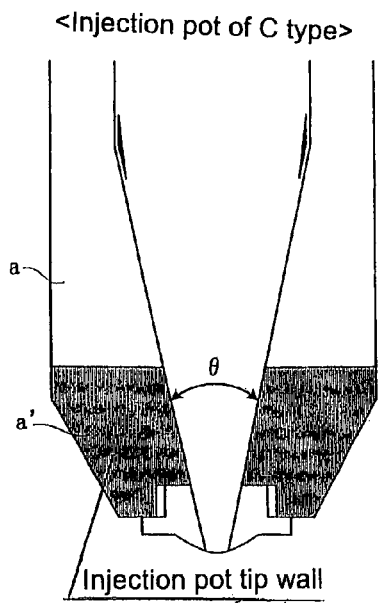
FIG. 8 is a diagrammatic sectional view showing still another example of relevant parts of an injection molding machine, for explaining the tip part angle of an injection pot and its performance.
Figure 9:
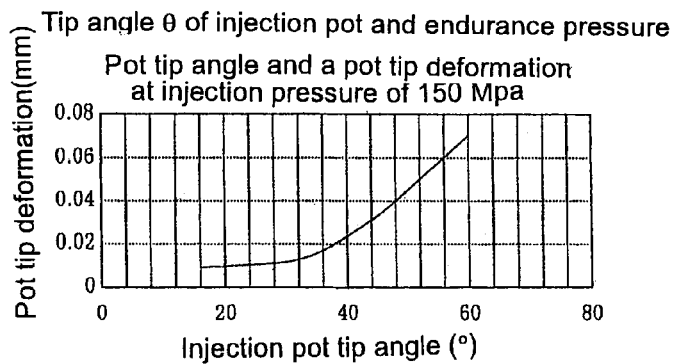
FIG. 9 is a correlation diagram between the tip part passage angle of an injection pot and endurance pressure.

In an embodiment illustrated in FIG. 4 the tip part 32-4 of an injection pot 34-3 is formed to have a tapered section extending downwardly from the lower end of body part 34-4 of an injection pot 34-4 via an oblique annular fitting part 38-4. An inner face of the injection nozzle 33 is also formed to have an inner wall 33a with a tapered section continuous with the tip part 32-4 of the injection pot, and the shape of the tip part 37-4 of plunger 36-4 is formed in a tapered shape that is similar to those of the injection pot tip part 32-4 and the inner wall 33a of the injection nozzle 33. The taper angle θ1 of the tip part 37-4 of the plunger 36-4 is set to be larger than the angle θ2 of the tip part 32-4 of the injection pot, and a clearance S-4 is formed below the fitting part 38-4, as shown in FIG. 4.

The clearance S-4 may be determined experimentally, so that a remaining amount of a formed material does not constitute an obstacle as scorch after the formed material is fed out from the tip part 32-4 of the injection pot, and ascending of the plunger 36-4 can be performed easily. The angle θ of the taper is determined according to the diameter of the injection pot 34-4, and depends on the size of the injection molding machine, the thickness of the upper die plate 11, and the position of an extruding machine mounted on the barrel 31.

With the above construction, when the plunger 36-4 is ascended while a formed material is being fed into the feeding port 35, or before feeding, the ascending can be performed easily. Besides, even when the formed material is injected out from the tip part 32-4 of the injection pot by pushing down the ascended plunger 36-4, the boundary part between the body part 34-4a of the injection 34-4 and the tip part 32-4 abuts on the fitting part 38-4 of the plunger 364 to pressingly cut off formed material extruded through port 35. Accordingly, formed material hardly remains as scorch in the space S-4.

Figure 10:
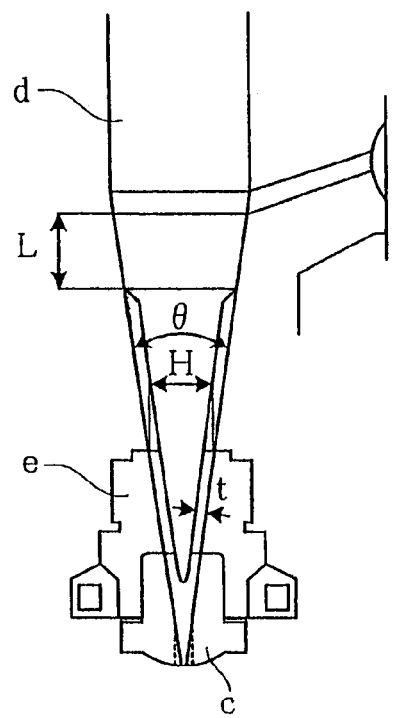
FIG. 10 is a diagrammatic sectional view showing one example of relevant parts of an injection molding machine, for explaining the clearance between an injection pot and a plunger.

Regarding the clearances S-1 to S-4, consideration is also made from the following viewpoint found by the inventor. That is, as illustrated in FIG. 10, where the length of a fitting part of a plunger d is represented as L, an injection pot tip part angle is represented as θ, an uppermost opening diameter of a nozzle holder "e" (which also serves as a tool for forming a vicinity of a tip of the injection pot) is represented as H, and the clearance between the plunger and the injection pot is represented as t, it is required that the equation $t \leq H/2$ be satisfied; that is, the clearance t is required to be equal to or less than ½ of the opening diameter H. This is because a sufficient thickness is required that, when rubber has been cured in the clearance t, cured rubber can be taken out after the nozzle c or the nozzle holder e is detached.

Figure 11:
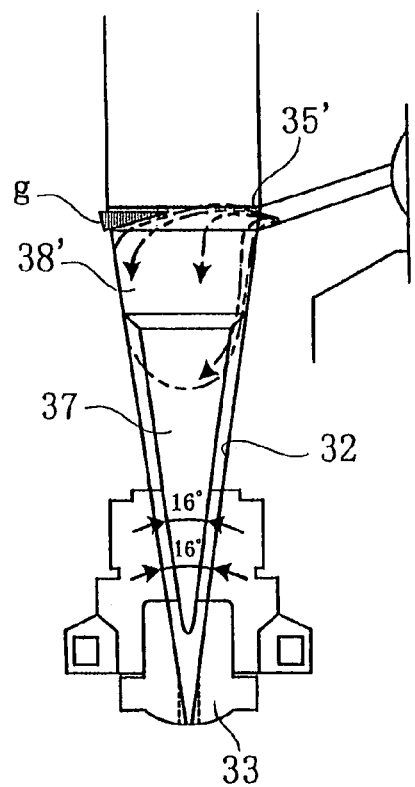
FIG. 11 is a diagrammatic sectional view of one example of relevant parts of an injection molding machine showing the effect of the position of a feeding port for a formed material.
Figure 12:
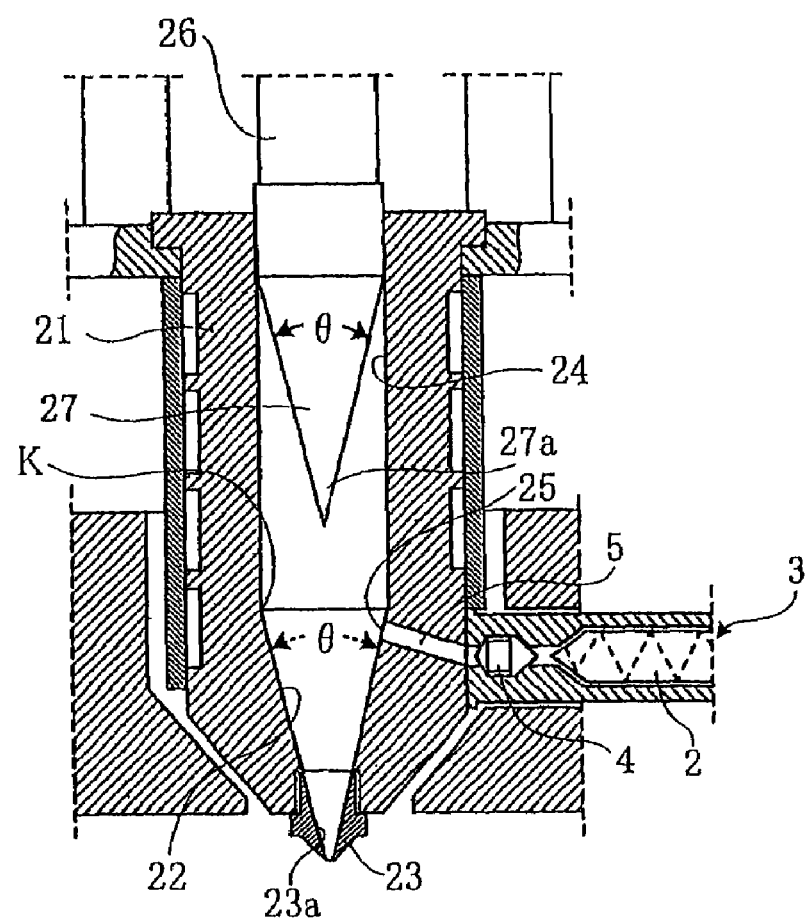
FIG. 12 is a diagrammatic sectional view of relevant parts of an embodiment of an injection molding machine according to a prior application before plunger actuation.
Figure 13:
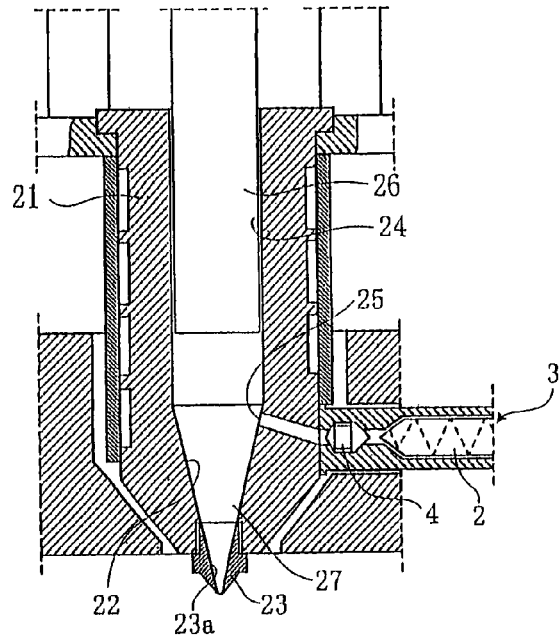
FIG. 13 is a diagrammatic sectional view of the relevant parts of an embodiment of the injection molding machine according to a prior application after plunger actuation.
Figure 14:
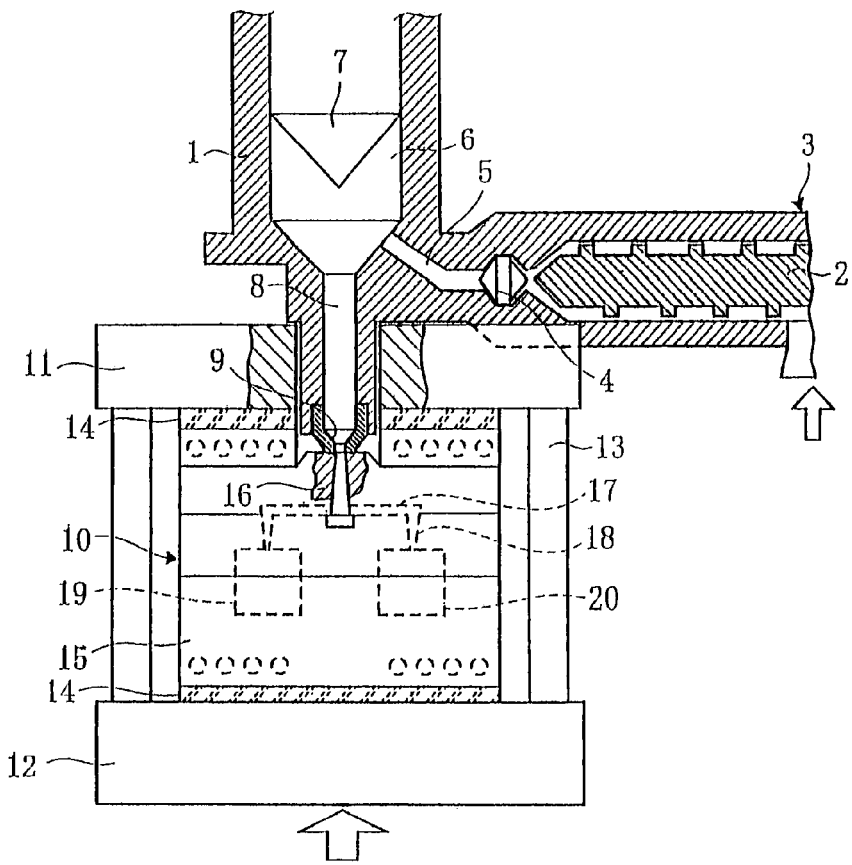
FIG. 14 is a diagrammatic sectional view showing a conventional injection molding machine and a mold.

By setting the position of the feeding port for a formed material in the barrel 31 at least above an upper end of the fitting part, as shown by reference numeral 35' in FIG. 11, a formed material expands from a generally upper edge of the fitting part 38' downward, as shown with a double-dotted chain line. Accordingly, after inserting the plunger tip 37 into the injection pot tip end 32 to inject rubber from the nozzle 33, the amount of rubber remaining in the injection pot tip 32 becomes small, as shown with "g", which facilitates replacement.

As described above, the present invention provides an injection molding machine capable of performing thermal control securely, especially for injection molding of rubber, performing an assured pressing cutting off and excellent injection of plasticized rubber in an injection pot, and performing effective removal of residual rubber in the injection pot with a lesser number of times of injection, and it is suitable to provide an injection molding machine capable of performing ascending of a plunger easily, thereby providing an efficient production efficiency and an excellent strength.

The invention claimed is:

1. An injection molding machine wherein an injection pot provided with an injection nozzle and a feeding port for supplying a formed material put in a plasticized state from a side part into the pot are formed in a barrel, comprising:
   a plunger slidably disposed in the injection pot;
   a tip part on said plunger, the tip part being formed in such a shape that a tip part of the injection pot can be generally filled with the formed material when an injection of the formed material is completed;
   a fitting part pressingly cutting off the formed material in the injection pot, the fitting part including a boundary part between a body part of the plunger and said tip part of the plunger, the fitting part being formed at a boundary part between a body part of the injection pot and the tip part thereof; and
   wherein a clearance is formed between the tip part of the plunger and the tip part of the injection pot in the fitting part or below and the feeding port is opened to the fitting part in the plunger when the tip part of the plunger is inserted into the tip part of the injection pot so as to generally fill the tip part of the injection pot.

2. The injection molding machine according to claim 1, wherein the fitting part is formed on an annular line around the plunger.

3. The injection molding machine according to claim 1, wherein the fitting part is formed in a ring shape with a width around the plunger.

4. The injection molding machine according to claim 1, wherein the feeding port is provided at least above the fitting part.

5. The injection molding machine according to claim 2, wherein the feeding port is provided at least above the fitting part.

6. The injection molding machine according to claim 3, wherein the feeding port is provided at least above the fitting part.

7. The injection molding machine of claim 1, wherein said tip part of the injection pot is formed so as to have a tapered section, and a tapered angle of the tip part of the injection pot is set in a range of 10° to 40°.

8. The injection molding machine according to claim 7, wherein the tip part of the plunger is formed in a tapered shape, and a tapered angle of the tip part of the plunger is larger than the tapered angle of the tip part of the injection pot.

9. The injection molding machine according to claim 8, wherein the clearance formed between the tip part of the plunger and the tip part of the injection pot in the fitting part or below is formed so as to increase in a downward direction from the fitting part to the tip part of the plunger when the tip part of the plunger is inserted into the tip part of the injection pot so as to generally fill the tip part of the injection pot.

10. The injection molding machine according to claim 7, wherein the tip part of the plunger is formed in a tapered shape, and a tapered angle of the tip part of the plunger is set to the same angle generally as the tapered angle of the tip part of the injection pot.

11. The injection molding machine according to claim 10, wherein the clearance formed between the tip part of the plunger and the tip part of the injection pot in the fitting part or below is formed so as to become constant generally in the vertical direction when the tip part of the plunger is inserted into the tip part of the injection pot so as to generally fill the tip part of the injection pot.

* * * * *